United States Patent
Yoshioka et al.

(10) Patent No.: US 6,937,031 B2
(45) Date of Patent: Aug. 30, 2005

(54) ELECTROSTATIC CAPACITY DETECTION APPARATUS AND FINGERPRINT CROSSCHECK APPARATUS USING THE SAME

(75) Inventors: Masaki Yoshioka, Kanagawa (JP); Motoyasu Yano, Kanagawa (JP); Keiichi Shinozaki, Kanagawa (JP)

(73) Assignee: Sony Corporation (JP)

( * ) Notice: Subject to any disclaimer, the term of this patent is extended or adjusted under 35 U.S.C. 154(b) by 282 days.

(21) Appl. No.: 10/363,547

(22) PCT Filed: Jul. 3, 2002

(86) PCT No.: PCT/JP02/06750

§ 371 (c)(1),
(2), (4) Date: Mar. 5, 2003

(87) PCT Pub. No.: WO03/008899

PCT Pub. Date: Jan. 30, 2003

(65) Prior Publication Data

US 2003/0174871 A1 Sep. 18, 2003

(30) Foreign Application Priority Data

Jul. 11, 2001 (JP) ........................................ 2001-210272

(51) Int. Cl.[7] ............................................... G01R 27/26
(52) U.S. Cl. ....................................... 324/662; 382/124
(58) Field of Search ................................. 324/661–663, 324/678, 679, 686; 345/93; 382/124; 361/283.1–283.4

(56) References Cited

U.S. PATENT DOCUMENTS

| | | | |
|---|---|---|---|
| 5,225,959 A | 7/1993 | Stearns | 361/283.1 |
| 6,448,790 B1 * | 9/2002 | Imai | 324/661 |
| 6,681,033 B1 * | 1/2004 | Yano et al. | 382/124 |
| 6,795,049 B2 * | 9/2004 | Toyoshima et al. | 345/93 |

FOREIGN PATENT DOCUMENTS

| | | | |
|---|---|---|---|
| JP | 61-040517 A1 | 2/1986 |
| JP | 05-215625 A1 | 8/1993 |
| JP | 2000-213908 A1 | 8/2000 |
| JP | 2000-346607 A1 | 12/2000 |

* cited by examiner

*Primary Examiner*—Vincent Q. Nguyen
(74) *Attorney, Agent, or Firm*—Rader, Fishman & Grauer PLLC; Ronald P. Kananen (57) ABSTRACT

A capacitance sensor used as a fingerprint sensor is provided which includes, in addition to a sensor array (11) in which sensor cells (100) each with a sense electrode are disposed in the form of an array, a canceling dummy block (14) having, disposed in an area having no relation with any object under detection, one column of dummy cells (141) corresponding to each row in the sensor array (11) and each having a dummy electrode nearly identical in parasitic capacitance to the sense electrode of the sensor cell (100). Also, a differentiation output unit (183) is provided to differentiate between a sensed voltage Vsig sensed at the sensor array (11) by sensing circuit (13) and sensed voltage Vdmy sensed at the canceling dummy block (14), thereby eliminating the influence of a variation in parasitic capacitance Cp, caused by a production tolerance.

4 Claims, 7 Drawing Sheets

PRIOR ART

FIG.7

ELECTROSTATIC CAPACITY DETECTION APPARATUS AND FINGERPRINT CROSSCHECK APPARATUS USING THE SAME

TECHNICAL FIELD

The present invention generally relates to a capacitance sensor and a fingerprint identification system or dactyloscopy system using the capacitance sensor and, more particularly, to a capacitance sensor suitable for use as a fingerprint sensor and a fingerprint identification system using the capacitance sensor.

BACKGROUND ART

Figure 1:
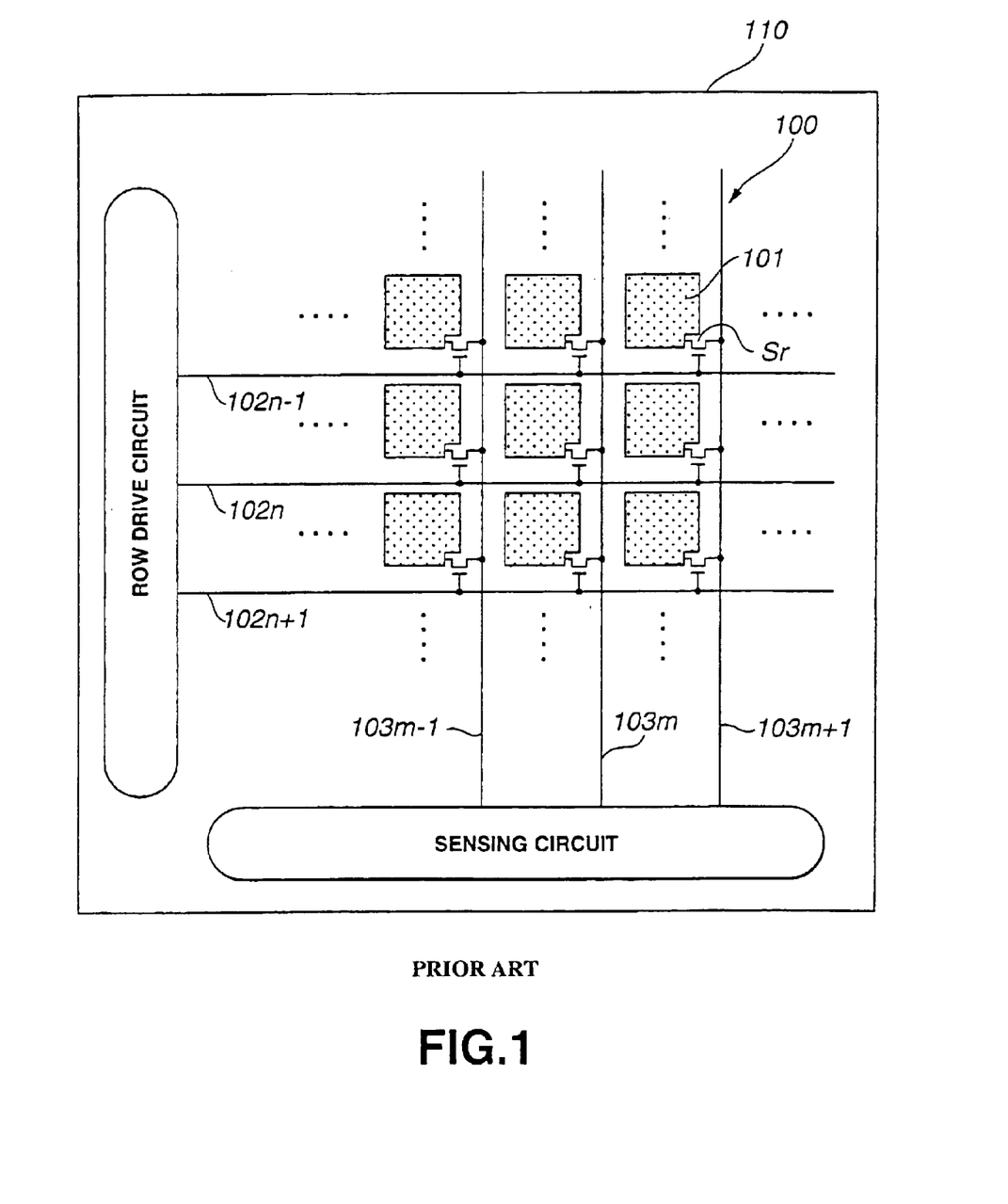
FIG. 1 is a schematic diagram of the fingerprint sensor, showing its basic circuit construction.

Heretofore, there have been proposed various types of fingerprint sensors. A typical one of them is shown in FIG. 1. The fingerprint sensor is generally indicated with a reference 110. The fingerprint sensor 110 includes a sensor cell 100 formed from an array of sense electrodes 101 laid on the surface of a semiconductor, a matrix of row select lines . . . , 102n 1, 102n, 102n+1, . . . and column sense lines . . . , 103m 1, 103m, 103m+1, . . . , positioned correspondingly to the sense electrodes 101, and cell select switches Sr connected between each of the sense electrodes 101 and column sense lines . . . , 103m 1, 103m, 103m+1, . . . . The cell select switches Sr are selected row by row via the row select lines . . . , 102n 1, 102n, 102n+1, . . . .

Figure 2:
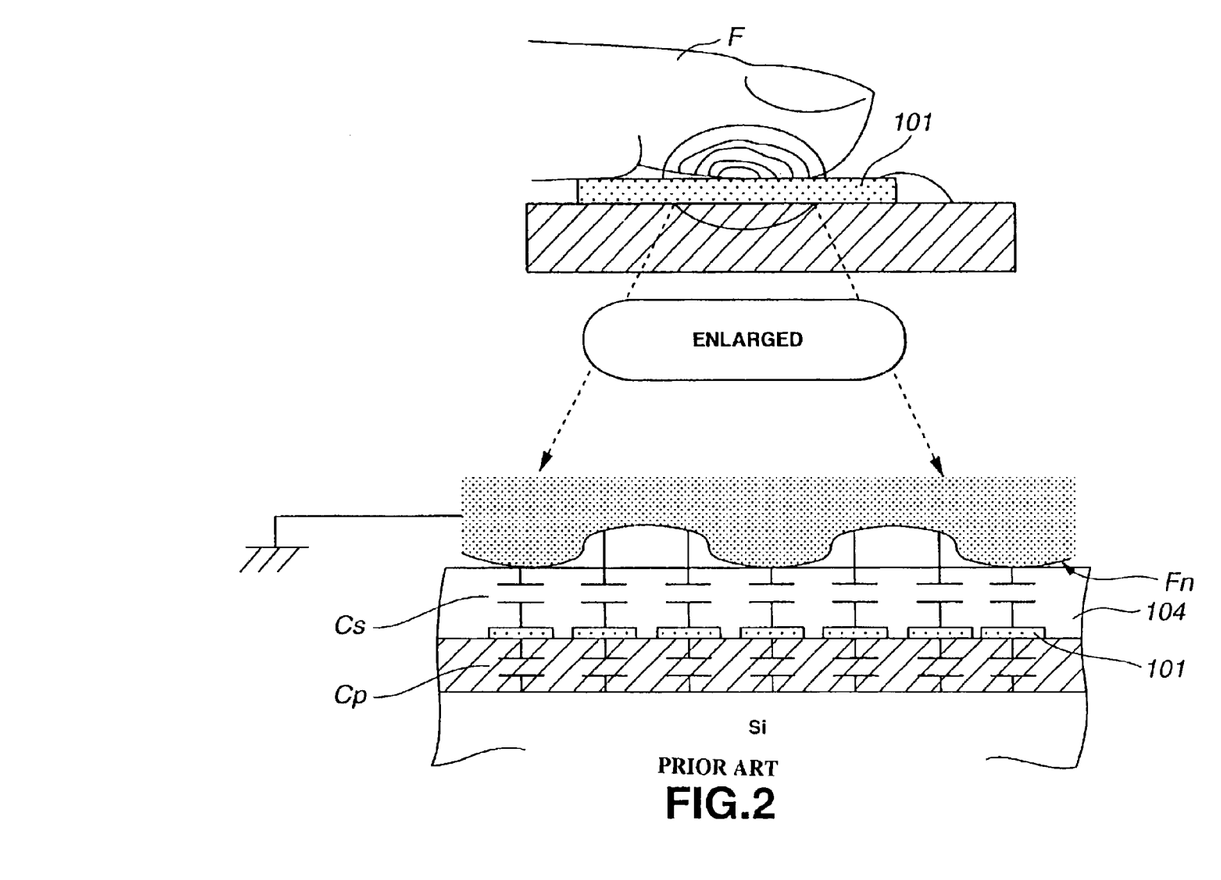
FIG. 2 shows the principle of the fingerprint sensor which senses a capacitance.

As shown in FIG. 2, when a finger F is placed on an overcoat 104 covering the sense electrodes 101 of the fingerprint sensor 110, a capacitance Cs develops between the sense electrode 101 and the surface Fh of the finger F correspondingly to irregularities of the fingerprint. The capacitance Cs is sensed to recognize a fingerprint pattern. More specifically, when a portion of the finger corresponding to a ridge portion of a fingerprint is on the sense electrode 101, the capacitance Cs developed between the sense electrode 101 and the finger surface will be large since the distance between the finger portion and sense electrode 101 is short. On the other hand, when a portion of the finger corresponding to a valley portion of the fingerprint is on the sense electrode 101, the capacitance Cs will be small since the distance between the finger portion and sense electrode 101 is long. Thus, by sensing the capacitance Cs, it is possible to recognize a pattern of the fingerprint. It should be noted that a capacitance Cp in FIG. 2 is a parasitic one between the sense electrode 101 and a Si (silicon) substrate.

To sense a capacitance Cs, it has been proposed to charge a capacitance Cs at a constant voltage and sense a charge stored in the capacitance Cs. This method is known as a "voltage charging method". A capacitance sensor adopting this voltage charging method is known from the Japanese Unexamined Application Publication No. 213908 of 2000, for example, which discloses a capacitance sensor in which a constant voltage is applied across a sense electrode and a charge stored in the sense electrode is converted into a voltage by a sensing circuit using an operational amplifier to sense a capacitance and to eliminate the influence of a parasitic capacitance between the sense electrode and a substrate, and there is provided a dummy electrode nearly identical in parasitic capacitance to the sense electrode to cancel the parasitic capacitance of the sense electrode.

In the above capacitance sensor, when there is not any object under detection on the sense electrode, that is, when no finger is placed on the sense electrode in case the capacitance sensor is used as a fingerprint sensor, or when a portion of the finger corresponding to a valley portion of a fingerprint is placed on the sense electrode, the sensing circuit senses a voltage Vsns as follows:

$$Vsns = Vref\{Cp \times (Vc\ Vref) Cp'(Vref\ Vd)\}/Cf \quad (1)$$

where Cp is a parasitic capacitance of the sense electrode, Vc is a constant voltage applied to the sense electrode, Cp' is a parasitic capacitance of the dummy electrode, Vd is a voltage applied to the dummy electrode, Vref is a reference voltage applied to the sensing circuit and Cf is a feedback capacitance of the sensing circuit (sense amplifier).

When the conditions Vc Vref=Vref Vd and Cp=Cp' in the expression (1) are satisfied, the sensed voltage Vsns will coincide with the reference voltage Vref (i.e., Vsns =Vref). To meet these conditions, it is necessary to apply a highly accurate voltage across the sense electrode. If the sensing circuit has an offset, the expression (1) will not be met.

Note that since the parasitic capacitances Cp and Cp' include a junction capacitance of the semiconductor as well and depend upon the bias, it is difficult to assure parasitic capacitances Cp and Cp' accurately equal in value to each other. Therefore, when no finger is placed on the sense electrode or when the finger is placed at a valley portion of the fingerprint on the sense electrode, for example, it is extremely difficult for all chips (fingerprint sensors) to provide the same no-signal output level (will be referred to as "air level" hereinafter).

In the fingerprint sensor, when a capacitance exists between the surface of a finger and the sense electrode, the output signal level will vary depending upon the surface condition of the finger and thus the variation of the output signal level is allowable to some extent. Therefore, the fingerprint sensor has normally a function to adjust the output signal level to correct its variation. Since the air level itself is taken as a reference, however, the allowable range of the variation in output signal level from one chip to another is limited.

DISCLOSURE OF THE INVENTION

Accordingly, the present invention has an object to overcome the above-mentioned drawbacks of the related art by providing a capacitance sensor capable of an improved accuracy and controllability of the air level by eliminating the influence of a variation of the parasitic capacitance of the sense electrode and a fingerprint identification system using the capacitance sensor.

The above object can be attained by providing a capacitance sensor including according to the present invention:

a sensor array in which sensor cells each having a sense electrode are disposed in the form of an array;

a dummy block having, disposed in a position corresponding to a row in an area outside the sensor array and having no relation with any object under detection, at least one dummy cell having a dummy electrode nearly identical in parasitic capacitance to the sense electrode of the sensor cell; and a differentiation circuit to differentiate between a sensor cell output from the sensor array and a dummy cell output from the dummy block.

The above capacitance sensor according to the present invention is used as a fingerprint sensor in a fingerprint identification system.

Also, the above object can be attained by providing a capacitance sensor, or a fingerprint identification system using the capacitance sensor as a fingerprint sensor, wherein:

a dummy cell in a dummy block has a parasitic capacitance nearly equal to that of a sense electrode of a sensor cell; and at least one dummy cell or preferably, one column of dummy cells is disposed in an area having no relation with the object under detection (an area where the finger will not be applied in case the capacitance sensor is used as a fingerprint sensor) and in a position corresponding to each row of sensor cells in a sensor array. By making a differentiation between sensor cell output and dummy cell output, it is possible to eliminate the influence of a variation in parasitic capacitance of the sense electrode that has been caused by a production tolerance.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below, concerning an embodiment of the capacitance sensor and an embodiment of the fingerprint sensor in which the capacitance sensor is applied, with reference to the accompanying drawings.

Figure 3:
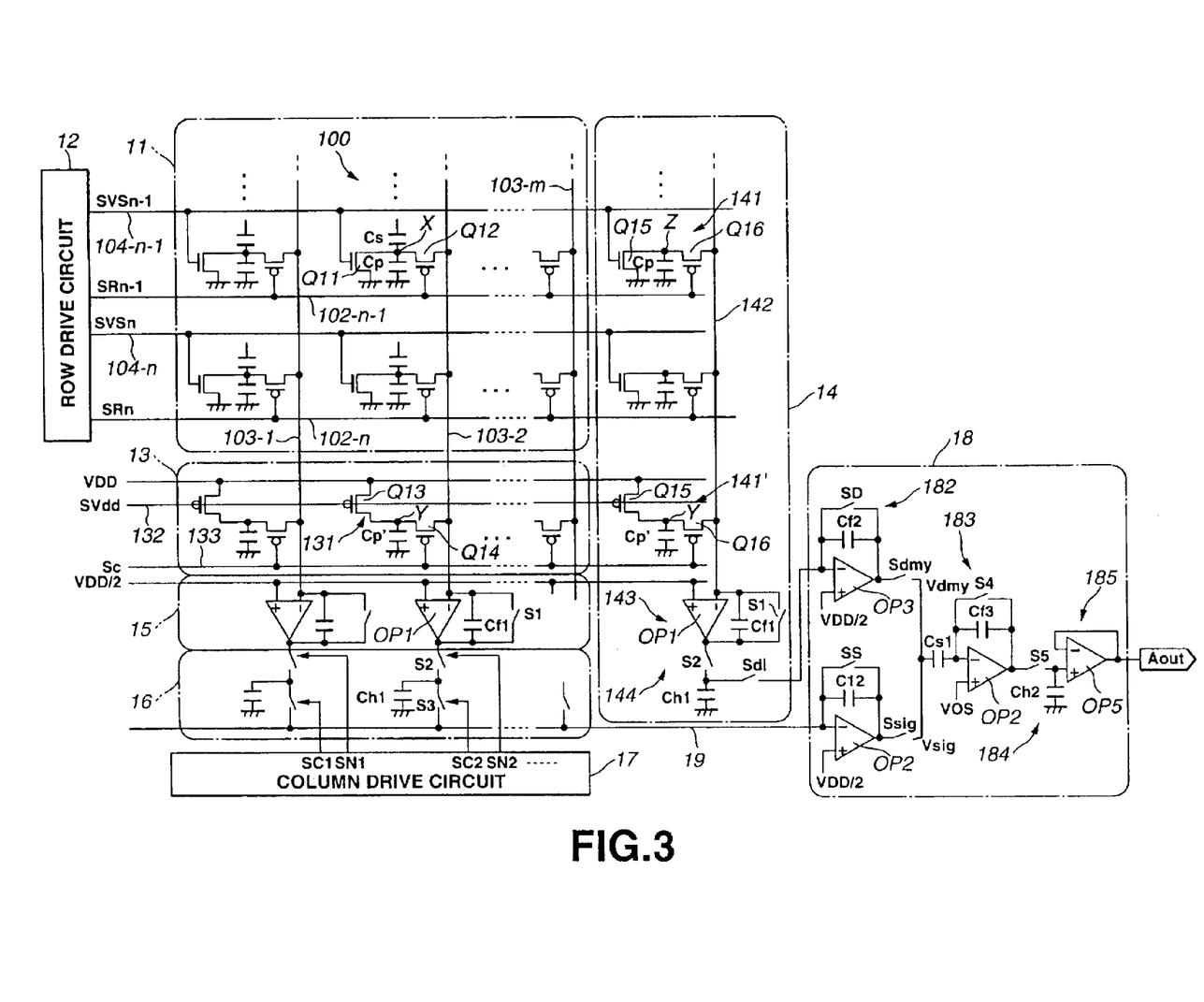
FIG. 3 is a circuit diagram of the capacitance sensor according to the present invention.

According to the present invention, the capacitance sensor is constructed as shown in FIG. 3. The capacitance sensor includes a sensor array 11, a row drive circuit 12, a parasitic capacitance cancel circuit 13, a canceling dummy block 14, a sensing circuit (sense amplifier) 15, a parallel-serial conversion circuit 16, a column drive circuit 17 and an output circuit 18, as shown in FIG. 3.

The sensor array 11 has disposed on the surface of a semiconductor substrate an array of m columns and n rows of sense electrodes each forming a sensor cell 100, as shown in FIG. 1. It should be noted that FIG. 3 shows the cell circuit construction of only two rows, (n−1)th row and n-th row of sensor cells 100. In relation to the sensor cells 100 disposed in the form of an array, row select lines . . . , 102n−1 and 102n and row control lines . . . , 104n−1 and 104n are disposed along each row and column sense lines 103-1, 103-2, . . . , 103m are disposed along each column, thus forming a matrix.

In the sensor cell 100, a capacitance Cs is one developed between the sense electrode and the surface of a finger, and a capacitance Cp is a parasitic capacitance between the sense electrode and semiconductor substrate. The sensor cell 100 has a first switch (e.g., Nch MOS transistor) Q11 connected between a sense node X of the capacitance Cs and a reference potential point (e.g., ground potential) and a second switch (e.g., Pch MOS transistor) Q12 connected between the sense node X and the column sense line 103 (103-1, 103-2, . . . , 103m). The MOS transistor Q11 is connected at the gate thereof to a row control line 104 (. . . , 104n−1 and 104n), while the MOS transistor Q12 is connected at the gate thereof to a row select line 102 (. . . , 102n−1 and 102n).

The row drive circuit 12 is formed from a shift register, for example. The row drive circuit 12 supplies low-level (will be referred to as "L level" hereinafter) row select pulses . . . , SRn 1 and SRn to the row select lines . . . , 102n−1 and 102n, respectively, in this order, whereby the MOS transistor Q12 of the sensor cell 100 is turned on. The row drive circuit 12 further supplies a high-level (will be referred to as "H level" hereinafter) row control pulses . . . , SVSn−1 and SVSn to the row control lines . . . , 104n−1 and 104n, respectively, in this order, whereby the MOS transistor Q11 of the sensor cell 100 is turned on.

The parasitic capacitance cancel circuit 13 is formed outside the sensor array 11, with one row of dummy cells 131 each corresponding to each row and having a dummy sense electrode (will be referred to as "dummy electrode" hereunder) formed similarly to the sense electrode of the sensor cell 100. A parasitic capacitance Cp' develops between the dummy electrode of the dummy cell 131 and the semiconductor substrate as at the sense electrode of the sensor cell.

In the dummy cell 131, a first switch (e.g., a Pch MOS transistor Q13) is connected between a sense node Y of the parasitic capacitance Cp' and a reference potential point (e.g., source voltage VDD). Also, a second switch (e.g., an Nch MOS transistor Q14) is connected between the sense node Y and the column sense line 103 (103-1, 103-2, . . . , 103m). These MOS transistors Q13 and Q14 are connected at the gates thereof to first and second control lines 132 and 133, respectively, to which control pulses SVdd and Sc are supplied, respectively.

The canceling dummy block 14 has disposed outside the sensor array 11, especially in an area having no relation with any object under detection or in an area to which the finger is not applied in this embodiment, one row of dummy cells 141 corresponding to each row of the sensor array 11 and the parasitic capacitance cancel circuits 13 along each row. The dummy cell 141 has a dummy electrode formed similarly to the sense electrode of the sensor cell 100. Also, a parasitic capacitance Cp" develops between the dummy electrode of the dummy cell 141 and the semiconductor substrate as at the sense electrode of the sensor cell 100.

In the dummy cell 141, a first switch, for example, an Nch MOS transistor Q15, is connected between a sense node Z of the parasitic capacitance Cp" and a reference potential point (ground potential in this embodiment). Also, a second switch, for example, a Pch MOS transistor Q16, is connected between the sense node Y and one sense line 142. The MOS transistor Q16 is connected at the gate thereof to the row control line 104 (. . . , 104n−1 and 104n), while the MOS transistor Q16 is connected at the gate thereof to the row select lines 102 (. . . , 102n−1 and 102n).

That is, the canceling dummy block 14 will be driven by row select pulses . . . , SRn 1 and SRn and row control pulses . . . , SVSn−1 and SVSn, sequentially supplied from the row drive circuit 12, as in the sensor array 11 except that a dummy cell 141' is provided as in the parasitic capacitance cancel circuit 13. Therefore, the same parasitic capacitance Cp' as the parasitic capacitance in the dummy electrode of the parasitic capacitance cancel circuit 13 develops at the dummy electrode of the dummy cell 141'. It should be noted that as will be described later, the canceling dummy block 14 has circuits corresponding to the sensing circuit 15 and parallel-serial conversion circuit 16.

As shown, the sensing circuit 15 includes an operational amplifier OP1 connected at the negative-phase input terminal thereof to one end of the column sense line 103 (103-1, 103-2, ..., 103m), a feedback capacitance Cf1 connected between the negative-phase (–) input terminal and output terminal of the operational amplifier OP1, and a switch S1 connected in parallel to the feedback capacitance Cf1. The basic circuit construction of the sensing circuit 15 is a circuit applied with a negative-feedback control via the feedback capacitance Cf1, and such a basic circuit is provided for each column. The operational amplifier OP1 is biased at the positive-phase (+) input terminal thereof to a half (VDD/2) of the source voltage VDD.

The parallel-serial conversion circuit 16 has provided for each column a sample & hold circuit having a sampling switch S2 and column select switch S3, connected in series to each other, and a hold capacitance Ch1 connected between a common junction of the switches S2 and S3 and the ground potential. These sample & hold circuits are connected between the output terminals of each column of the sensing circuit 15 and an output signal line 19.

In the parallel-serial conversion circuit 16, the sampling switch S2 and column select switch S3 are sequentially driven by sampling pulses SN1, SN2, ... and column select pulses SC1, SC2, ..., sequentially supplied from the column driven circuit 17. That is, when the column select switch S3 for each column is sequentially turned on, the parallel-serial conversion circuit 16 will provide a parallel-serial conversion. The column drive circuit 17 is formed from a shift register, for example, to sequentially provide sampling pulses SN1, SN2, ... and column select pulses SC1, SC2, ...

The aforementioned canceling dummy block 14 has also provided therein a sensing circuit 143 constructed similarly to the basic circuit construction of the sensing circuit 15, namely, it is composed of an operational amplifier OP1, a feedback capacitance Cf1 and a switch S1, and a sample & hold circuit 144 constructed similarly to the basic circuit construction (sample & hold circuit) of the parallel-serial conversion circuit 16, that is, it is composed of a sampling switch S2, a select switch Sd1 and a hold capacitance Ch1.

The output circuit 18 includes a first front-stage output unit 181 provided correspondingly to the parallel-serial conversion circuit 16, a second front-stage output unit 182 provided correspondingly to the canceling dummy block 14, a differentiation output unit 183 to differentiate between output signals from the front output units 181 and 182, a sample & hold circuit 184 to sample and hold a difference output from the differentiation output unit 183, and a drive unit 185 at the last stage of the output circuit 18.

The above first front-stage output unit 181 includes an operational amplifier OP2 supplied with an inverted one of the output signal from the parallel-serial conversion, circuit 16, a feedback capacitance Cf2 connected between the inverting input terminal and the output terminal of the operational amplifier OP2 and biased at the positive-phase input terminal thereof to a voltage of VDD/2, and a switch SS connected in parallel to the feedback capacitance Cf2.

The second front-stage output unit 182 includes an operational amplifier OP3 supplied with an inverted one of the output signal from the canceling dummy block 14, a feedback capacitance Cf2 connected between the inverting input terminal and the output terminal of the operational amplifier OP3 and biased at the positive-phase input terminal thereof to VDD/2, and a switch SD connected in parallel to the feedback capacitance Cf2. It should be noted that since the feedback capacitance to the first and second front-stage output units 181 and 182 are set to have the same value, the feedback capacitances in these first and second front-state output units 181 and 182 are indicated with the same reference Cf2.

The differentiation output unit 183 includes switches Ssig and Sdmy connected at one end thereof to the output terminals of the first and second front-stage output units 181 and 182, a capacitance Cs1 connected at one end thereof commonly to the other end of the switches Ssig and Sdmy, an operational amplifier OP4 connected at the inverting input terminal thereof to the other end of the capacitance Cs1, a feedback capacitance Cf3 connected between the inverting input terminal and output terminal of the operational amplifier OP4 and biased at the positive-phase input terminal thereof to a reference voltage VOS, and a switch S4 connected in parallel to the feedback capacitance Cf3.

The sample & hold circuit 184 includes a sampling switch S5 connected at the input terminal thereof to the output terminal of the differentiation output unit 183, that is, to the output terminal of the operational amplifier OP4, and a hold capacitance Ch2 connected to the output terminal of the sampling switch S5 and the ground potential. The drive unit 185 is a voltage follower formed from an operational amplifier OP5 using, as the positive-phage input, the hold output of the hold capacitance Ch2 in the sample & hold circuit 184 and having the negative-phase input terminal and the output terminal thereof short-circuited to each other.

Figure 4:
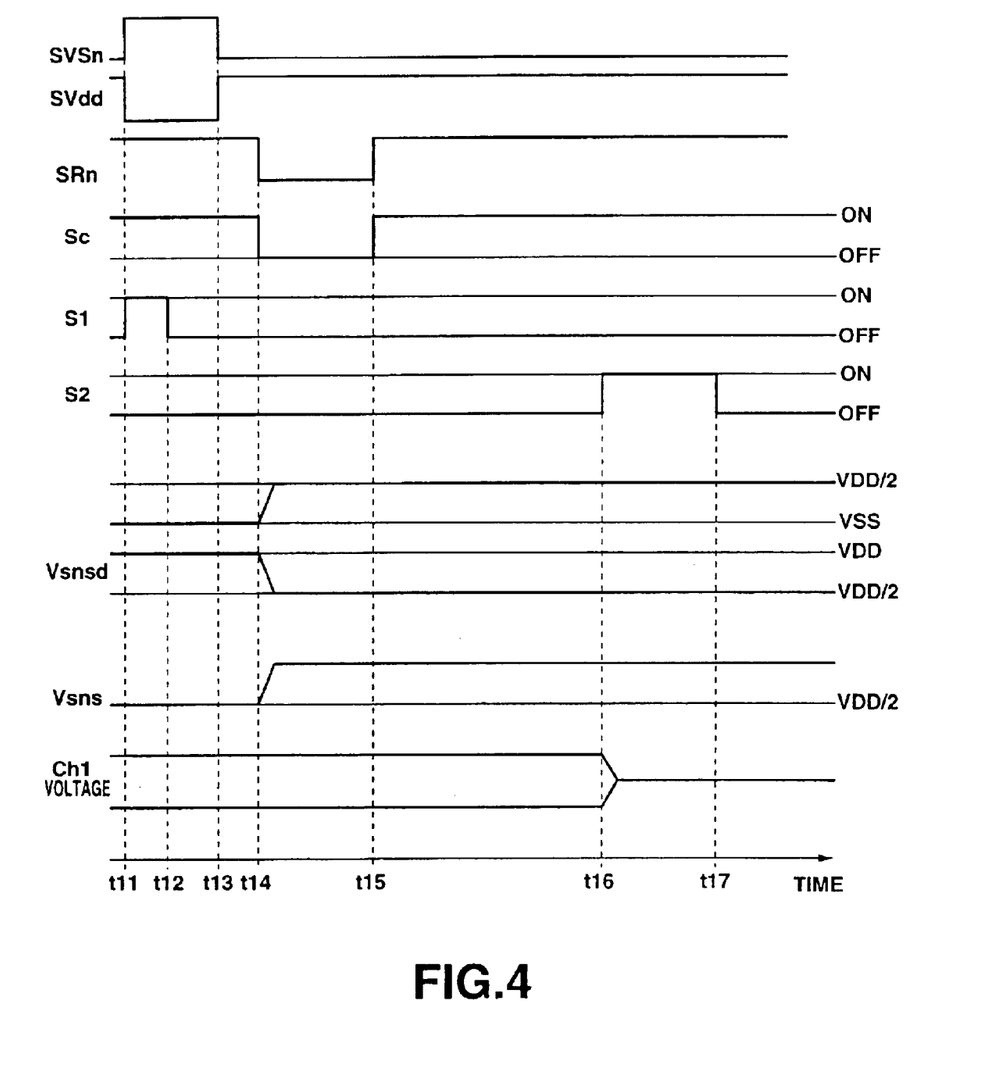
FIG. 4 is a timing chart for explaining the operations of the sensor array, capacitance cancel circuit, canceling dummy block and sensing circuit.
Figure 5:
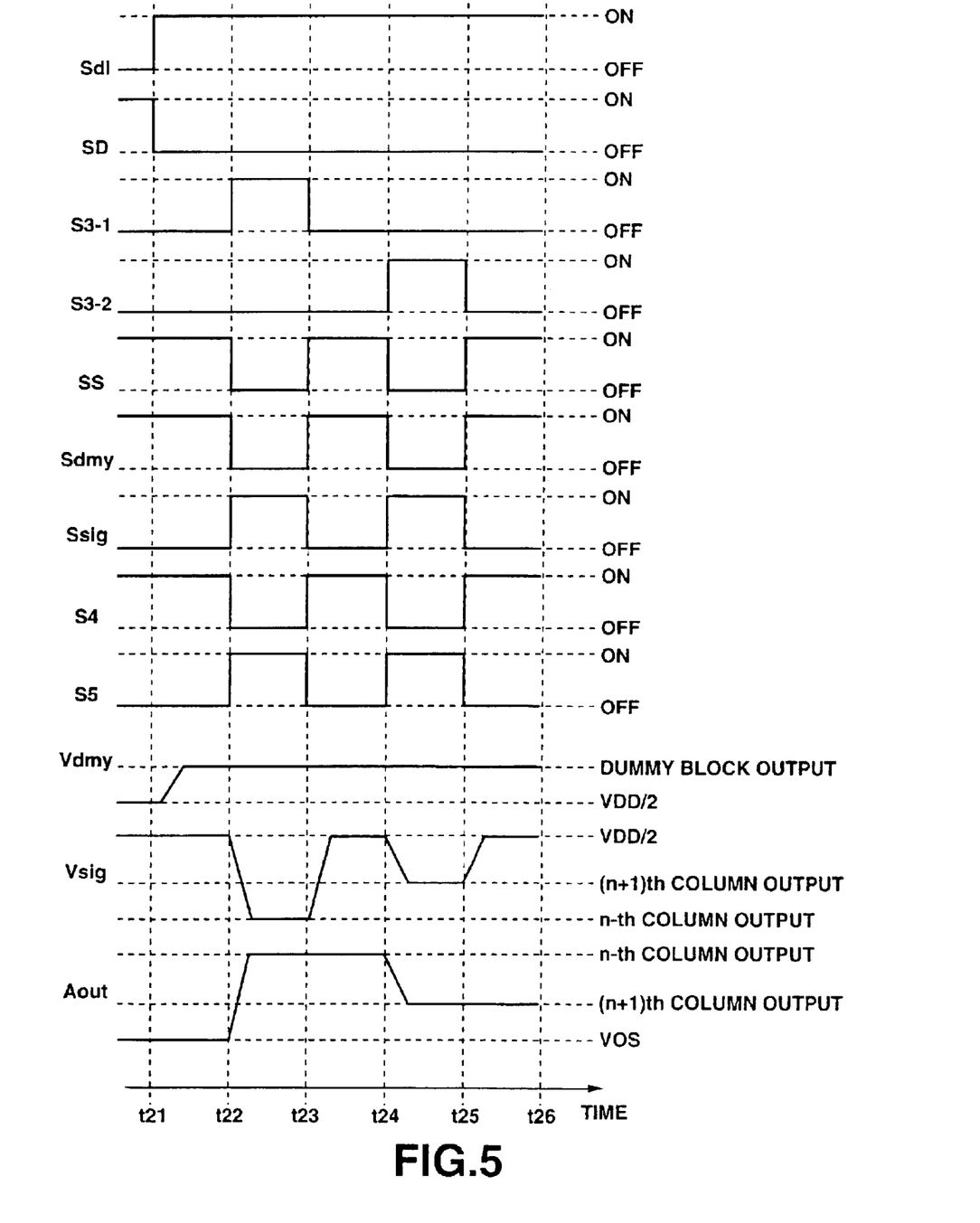
FIG. 5 is a timing chart for explaining the operations of a parallel-serial conversion circuit and output circuit.

The capacitance sensor constructed as above operates as will be described below with reference to the timing charts in FIGS. 4 and 5, First, the operations of the sensor array 11, a parasitic capacitance cancel circuit 13, a canceling dummy block 14 and a sensing circuit 15 will be described, on the assumption that the n-th row in the sensor array 11 is selected, with reference to the timing chart in FIG. 4.

First, at a time t11, the switches S1 of the sensing circuit 15 and canceling dummy block 14 are turned on to discharge the feedback capacitance Cf1 to zero. At this time, the column sense lines 103-1 to 103m of the sensor array 11 and sense line 142 of the canceling dummy block 14 are virtually grounded to VDD/2 under the action of the operational amplifiers OP1 in the sensing circuits 15 and 143. It should be noted that the sampling switches S2 of the parallel-serial conversion circuit 16 and canceling dummy block 14 are off.

At the time t11, all the row control pulses SVS1 to SVSn supplied from the row drive circuit 12 are simultaneously set to the H level to turn on the MOS transistor Q11 of the sensor cell 100 and the MOS transistor Q15 of the dummy cell 141. Thus, both the sense electrode of the sensor cell 100 and the dummy electrode of the dummy cell 141 will be biased to the VSS level (ground potential level in this embodiment).

Simultaneously, the control pulse SVdd supplied to the parasitic capacitance cancel circuit 13 is set to the L level to turn on the MOS transistor Q13 of the dummy cell 131 and the MOS transistor Q15 of the dummy cell 141'. Thus, both the dummy electrodes of the dummy cells 131 and 141' will be biased to the VDD level.

In this condition, at a time t12, the switches S1 of the sensing circuit 15 and the canceling dummy block 14 are turned off; then at a time t13, the control pulse SVdd is set to the H level to turn off the MOS transistors Q13 and the Q15 of the dummy cells 131 and 141', respectively, and only the row control pulse SVSn for the n-th row, for example, is set to L level by the scanning by the row drive circuit 12, thereby selecting the n-th row in the sensor array 11. At this time, since a charge is held at each node, the potential will not change.

Next, at a time t14, the row select pulse SRn corresponding to the n-th row selected as above is set to the L level to turn on the MOS transistors Q12 and Q16 of the sensor cell 100 and the dummy cell 141, respectively, thereby short-circuiting the sense electrode and column sense lines 103-1 to 103m in the sensor cell 100 to each other and the dummy electrode and sense line 142 of the dummy cell 141 to each other.

At this time, since the column sense lines 103-1 to 103m and sense line 142 are virtually grounded to VDD/2, the potential at the sense electrode and the dummy electrode changes from VSS to VDD/2. Because of this potential change, a charge of $\{VDD/2 \times (Cs+Cp)\}$ moves from the sense electrode to the feedback capacitance Cf1 of the sensing circuit 15, while a charge of $(VDD/2 \times Cp")$ moves from the dummy electrode to the feedback capacitance Cf1 of the sensing circuit 143.

Simultaneously, at the time t14, the control pulse Sc supplied to the capacitance cancel circuit 13 is set to the L level to turn on the MOS transistors Q14 and Q16 of the dummy cells 131 and 141', respectively, thereby short-circuiting the dummy electrode and column sense lines 103-1 to 103m in the dummy cell 131 to each other and the dummy electrode and sense line 142 in the dummy cell 141' to each other. At this time, since the potential at each dummy electrode of the dummy cells 131 and 141' changes from VDD to VDD/2, a charge of $VDD/2 \times Cp'$ moves from the dummy electrode of the dummy cell 131 to the feedback capacitance Cf1 of the sensing circuit 15, while a charge of VDD/2 Cp' moves from the dummy electrode of the dummy cell 141' to the feedback capacitance Cf1 of the sensing circuit 143.

Eventually, the feedback capacitance Cf1 of the sensing circuit 15 at the sensor array 11 stores a charge of $\{VDD/2 \times (Cs+Cp-Cp')\}$, and the sensed voltage Vsns from the sensing circuit 15 will be:

$$Vsns = VDD/2 - 1/Cf1\{(Cs+Cp) \times (VSS\ VDD/2) + Cp'(VDD - VDD/2)\}$$

$$= VDD/2\ 1/Cf1 \times (Cp' - Cp - Cs) \times VDD/2$$

On the other hand, the feedback capacitance Cf1 of the sensing circuit 143 at the canceling dummy block 14 stores a charge of $\{VDD/2 \times (Cp-Cp")\}$, and the sensed voltage Vsnsd from the sensing circuit 143 will be:

$$Vsnsd = VDD/2 - 1/Cf1\{Cp" \times (VSS - VDD/2) + Cp'(VDD - VDD/2)\}$$

$$= VDD/2 - 1/Cf1 \times (Cp'\ Cp") \times VDD/2$$

Next, at a time t15, the row select pulse SRn for the n-th row is set to the H level to turn off the MOS transistor Q12 of the sensor cell 100 and the MOS transistor Q16 of the dummy cell 141, thereby disconnecting the sense electrode of the sensor cell 100 from the column sense lines 103-1 to 103m and the dummy electrode of the dummy cell 141 from the sense line 142.

Simultaneously, at this time, the control pulse Sc is set to the H level to turn off the MOS transistors Q14 and Q16 of the dummy cells 131 and 141', respectively, thereby disconnecting the dummy electrode of the dummy cell 131 from the column sense lines 103-1 to 103m and the dummy electrode of the dummy cell 141' from the sense line 142.

Next, at a time t16, the sampling switches S2 of the parallel-serial conversion circuit 16 and canceling dummy block 14 are turned on to move the sensed voltages Vsns and Vsnsd from the sensing circuits 15 and 143, respectively, to the hold capacitance Ch1, and then, at a time t17, the sampling switch S2 is turned off to make a sample and hold operation.

With the above-mentioned sequence of operations, the sensed voltage Vsns on one line (n-th row in this embodiment) of the sensor array 11 will be held in the hold capacitance Ch1 of the sample & hold circuit in each column in the parallel-serial conversion circuit 16, and the sensed voltage Vsnsd from the canceling dummy block 14 will be held in the hold capacitance Ch1 of the sample & hold circuit 144 in the canceling dummy block 14.

Next, the operations of the parallel-serial conversion circuit 16 and the output circuit 18 will be described with reference to the timing chart in FIG. 5.

In the initial condition, the select switch Sd1 of the sample & hold circuit 44 in the canceling dummy block 14, all the column select switches S3 (S3-1 to S3m) on the columns in the parallel-serial conversion circuit 16, the sampling switch S5 of the sample & hold circuit 184 in the output circuit 18 and the switch Ssig of the differentiation output circuit 183 are off, while the switch SD of the second front-stage output unit 182 in the output circuit 18, switch the SS of the first front-stage output unit 181, and the switches S4 and Sdmy of the differentiation output unit 183 are on. At this time, the output voltage from the first front-stage output unit 181 is VDD/2, while the output voltage from the differentiation output unit 183 is the reference voltage VOS.

Next, at a time t21, the select switch Sd1 of the sample & hold circuit 144 in the canceling dummy block 14 is turned on, while the switch SD of the second front-stage output unit 182 in the output circuit 18 is turned off. At this time, the output voltage Vdmy from the second front-stage output unit 182 in the output circuit 18 will be:

$$Vdmy = VDD/2 - Ch1/Cf2 \times (Vsnsd\ VDD/2) \quad (2)$$

$$= VDD/2 - Ch1/(Cf2 \times Cf1) \times (Cp" - Cp') \times VDD/2$$

Next, at a time t22, the switch Sdmy of the differentiation output unit 183, the switch SS of the first front-stage output unit 181 and the switch S4 of the differentiation output unit 183 are turned off, the switch Ssig of the differentiation output unit 183 and the sampling switch S5 of the sample & hold circuit 184 are turned on, and the column select switch S3-1 for the first column in the parallel-serial conversion circuit 16 is turned on by scanning by the column drive circuit 17.

Thus, the output voltage Vsig from the first front-stage output unit 181 will be:

$$Vsig = VDD/2 - Ch1/Cf2 \times (Vsns - VDD/2) \quad (3)$$
$$= VDD/2 - Ch1/(Cf2 \times Cf1) \times (Cs + Cp\ Cp') \times VDD/2$$

At this time, since the voltage of the capacitance Cs1 of the differentiation output unit 183 changes from Vdmy to Vsig, the output voltage Aout from the output circuit 18 will be:

$$Aout = VOS + Cs1/Cf3 \times (Vdmy - Vsig)$$
$$= VOS + (Cs1 \times Ch1)/(Cf1 \times Cf2 \times Cf3) \times (Cs + Cp - Cp'') \times VDD/2$$

By designing the dummy electrode of the dummy cell 141 in the canceling dummy block 14, that is, provided correspondingly to each of the rows in the sensor cell 100 of the sensor array 11, such that the parasitic capacitance Cp" developed at the dummy electrode is equal to the parasitic capacitance Cp developed at the sense electrode of the sensor cell 100 (namely, CP=Cp'), the output voltage Aout from the output circuit: 18 will be:

$$Aout = VOS + (Cs1 \times Ch1)/(Cf1 \times Cf2 \times Cf3) \times Cs \times VDD/2 \quad (5)$$

Thus, an offset caused by the parasitic capacitance Cp of the sense electrode of the sensor cell 100 can be canceled to eliminate the influence of a variation in parasitic capacitance Cp that has been caused by a production tolerance.

Next, at a time t23, the switch Ssig of the differentiation output unit 183, the sampling switch S5 of the sample & hold circuit 184 and the column select switch S3-1 for the first column in the parallel-serial conversion circuit 16 are turned off, while the switch Sdmy of the differentiation output circuit 183, the switch SS of the first front-stage output unit 181 and the switch S4 of the differentiation output unit 183 are turned on. Thus, the output voltage Aout from the output circuit 18 will be held in the hold capacitance Ch2 of the sample & hold circuit 184. At this time, the differentiation output unit 183 will be supplied with the same voltage Vdmny as at the time t21.

Subsequently, the sample and hold operation for the first column (operations included between the time t21 to t23) is repeated for each of the second, third, ..., m-th column, in this order, synchronously with the scanning by the column drive circuit 17 to convert the sensed voltage Vsns on one row (n-th row) from parallel to serial, whereby values corresponding to the hold voltages for the columns are sequentially provided time-serially as the output voltage Aout via the output circuit 18. At the same time, the operations as in the timing chart in FIG. 5 will be done for sensing a next row during the period from the time t21 to t23. Thus, a sense output will be provided sequentially as to all the sensor cells 100 in the sensor array 11.

As mentioned above, by providing a parasitic capacitance cancel circuit 13 formed from one row of dummy cells 131 each having a dummy electrode and designing the dummy electrode such that the parasitic capacitance Cp' developed at the dummy electrode is equal to the parasitic capacitance Cp developed at the sense electrode of the sensor cell 100, the aforementioned operation of the parasitic capacitance cancel circuit 13 causes CP Cp' to be 0 (zero) in the above expression (3), so that the charge of the parasitic capacitance Cp of the sense electrode can be canceled by the charge of the parasitic capacitance CP' of the dummy electrode, thereby providing a signal free from any DC offset caused by the parasitic capacitance Cp of the sense electrode.

Note that since the parasitic capacitance Cp developed at the sense electrode of the sensor cell 100 and the parasitic capacitance Cp' developed at the dummy electrode of the dummy cell 131 include the junction capacitance of the semiconductor as having previously been described and thus depend upon a bias, it is difficult to accurately equalize the capacitances Cp and Cp' to each other, and the influence of the production tolerance cannot be disregarded. Therefore, it will be extremely difficult to assure equal output levels, namely, equal air-level values, in the no-signal state.

Especially, since the distance from the parasitic capacitance cancel circuit 13 is different at a side near the first row in the sensor array 11 from at a side near the n-th row, so in the case where the dummy electrode of the parasitic capacitance cancel circuit 13 is designed with reference to the sense electrode in the first row, which is an extreme example, there will possibly take place a difference between the parasitic capacitance developed at the dummy electrode in the first row and that at the sense electrode in the n-th row. So, in case the parasitic capacitance of the sense electrode differs from one row to another in an extreme case, the air level will also differ from one row to another.

On the contrary, in this embodiment of the capacitance sensor according to the present invention, the canceling dummy block 14 formed from one column of dummy cells 141 each having the dummy cell on which a parasitic capacitance nearly the same as that at the sense electrode of the sensor cell 100 is provided in the area having no relation with the object under detection or the area where the finger is not applied in this embodiment. So, even if a production tolerance causes the parasitic capacitance of the sense electrode to vary, a similar variation will take place in the parasitic capacitance developed at the dummy electrode corresponding to each row, and the influence of the variation in parasitic capacitance of the sense electrode can be eliminated by differentiating between the outputs from the sensor cell 100 and the dummy cell 141.

More specifically, as will be apparent from the above expression (5), the output voltage Aout from the capacitance sensor is a production of the capacitance Cs of the sensor cell 100 by a capacitance ratio of each part and a bias voltage. So, the influence of the production tolerance is only for the capacitance ratio in one chip, and thus the output voltage Aout can be assured to have an accurate value. Also, the air level is a value resulting from the expression (5) when the capacitance Cs is 0 (zero), namely, it is Aout=VOS. Therefore, the constant voltage VOS applied from outside is taken as a reference voltage, and since the production tolerance will have less influence, the air level can easily be managed and controlled.

Note that in the aforementioned embodiment, the canceling dummy block 14 is formed from one column of dummy cells 141, but all the dummy cells 141 in one column are not required. Namely, the canceling dummy block 14 may be formed from at least one dummy cell 141 may and the output of the dummy cell 141 be used commonly for each row in the sensor array 11. In this case, the same effect also can be assured. However, when the parasitic capacitance Cs developed at the sense electrode differs at the first row from at the n-th row in the sensor array 11 among others, one column of dummy cells 141 should be provided for each row, which will be very effective since the influence of the variation of the parasitic capacitance Cs on each row can be positively eliminated.

In the aforementioned example, the canceling dummy block 14 formed from one column of dummy cells 141 is provided only at the right side of the sensor array 11. However, such a canceling dummy block 14 may be provided on either side of the sensor array 11. In this case, the right-hand area of the sensor array 11 should be covered by the right-hand canceling dummy block, while the left-hand area of the sensor array 11 should be covered by the left-hand canceling dummy block, and also the output circuit 18 should be formed from two systems.

In case the canceling dummy block is provided on either side of the sensor array 11 as above, the dummy cell 141 can be disposed nearer to each of the sensor cells 100 in the sensor array 11. Thus, since the parasitic capacitance of the sense electrode can be more approximate to that of the dummy electrode, the influence of the variation of the parasitic capacitance Cp can be nulled more positively by differentiating between the outputs of the sensor cell 100 and the dummy cell 141.

The aforementioned embodiment of the capacitance sensor has been described as a one provided with the parasitic capacitance cancel circuit 13. However, it is not always necessary to provide the parasitic capacitance cancel circuit 13. That is to say, as will be apparent from the above description of the operations of the capacitance sensor, since the charge of the parasitic capacitance Cp developed at the sense electrode of the sensor cell 100 can be canceled by the parasitic capacitance Cp" developed at the dummy electrode of the dummy cell 141 without having to provide the parasitic capacitance cancel circuit 13, it is possible to assure a signal free from any DC offset caused by the parasitic capacitance Cp of the sense electrode.

Further, in the above embodiment, the sensor cell 100 and dummy cell 141 are applied with VSS (ground potential in this embodiment), the dummy cell 131 is applied with VDD and the operational amplifier OP1 of the sensing circuit 15 is applied with VSS/2, respectively, as a DC voltage. However, it should be noted that these DC voltages are just examples and they may be any arbitrary DC voltages each of which has a potential difference necessary for sensing.

Note that in the foregoing, the capacitance sensor according to the present invention, used as a fingerprint sensor, has been described. However, the present invention is not limited to the field of fingerprint sensing but also can be applied in a general pattern detection system for detecting an irregularity of an object that will cause a capacitance Cs between itself and a sense electrode when the object is placed on an overcoat (equivalent to the overcoat 104 shown in FIG. 2) on the sense electrodes of the sensor cells 100.

Figure 6:
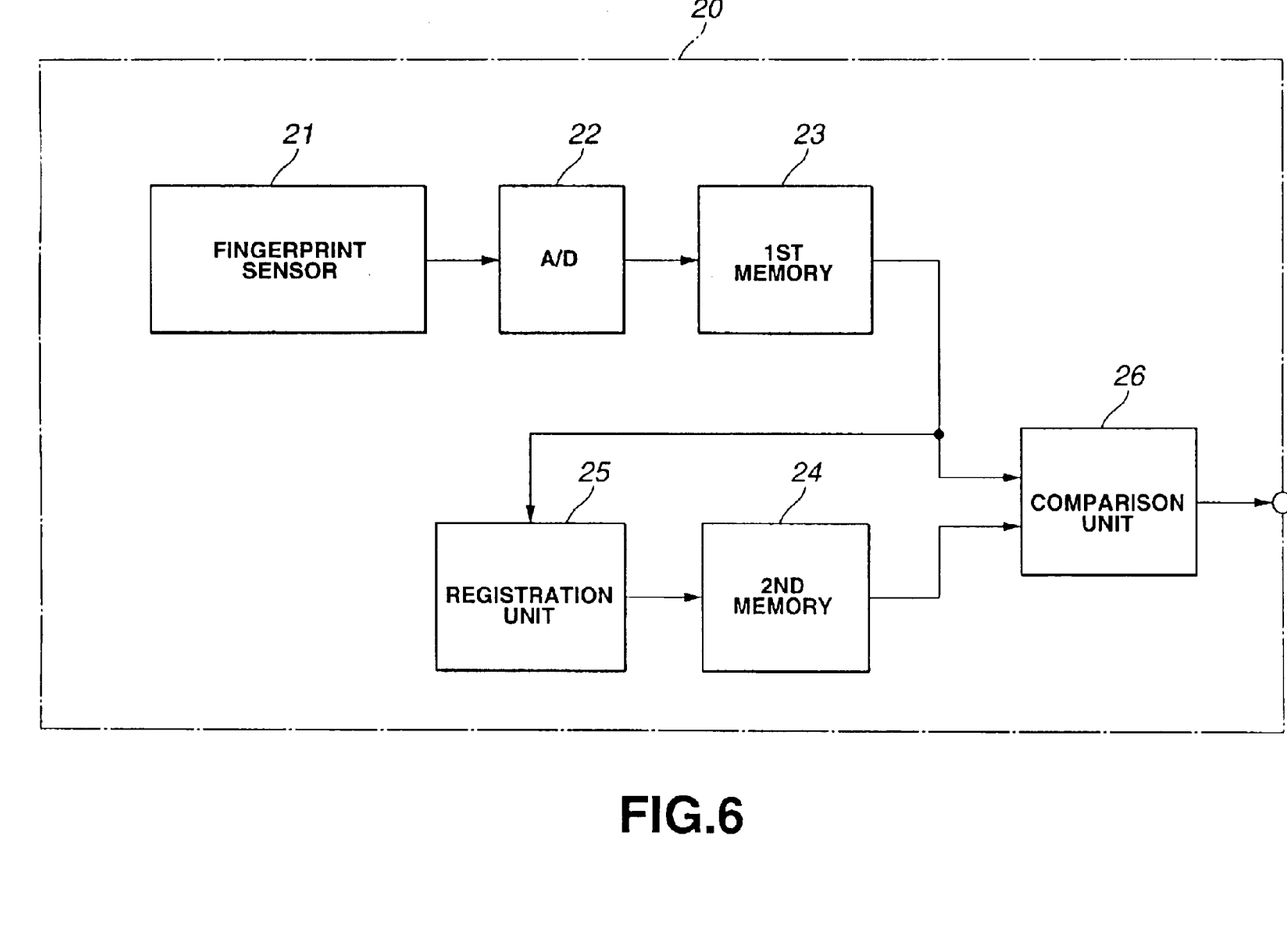
FIG. 6 is a block diagram of an example of the fingerprint identification system according to the present invention.

FIG. 6 is a block diagram of an example of the fingerprint identification system according to the present invention that uses the aforementioned capacitance sensor as a fingerprint sensor. The fingerprint identification system is generally indicated with a reference 20. As shown in FIG. 6, the fingerprint identification system 20 includes a fingerprint sensor 21, and A-D converter 22, a first and second memories 23 and 24, a registration unit 25 and a comparator 26.

The fingerprint identification system 20 according to the present invention uses the capacitance sensor according to the present invention as the fingerprint sensor 21. More specifically, the fingerprint sensor 21 includes, in addition to the sensor array formed from a matrix of sensor cells, a dummy cell block which will not be influenced by the capacitance of an object under detection, and which is arranged to eliminate the influence of the variation of the parasitic capacitance developed at the sense electrode of the sensor cell by differentiating between outputs from the sensor cell and the dummy cell.

The voltage output from the fingerprint sensor 21 is converted into a digital form by the A-D converter 22 and then stored into the first memory 23. The registration unit 25 to be used for pre-registration of a fingerprint pattern that will be used in the fingerprint identification system. When registering a fingerprint pattern, for example, only features are extracted from fingerprint information stored in the first memory 23 and information on the feature group is stored as registered pattern information into the second memory 24.

The comparison unit 26 is provided to compare the sensed fingerprint information detected by the fingerprint sensor 21 and stored in the first memory 23 with the registered pattern information pre-stored as the features in the second memory 24, for example. When the sensed fingerprint information is coincident with the registered pattern information, the comparison unit 26 will determine that the fingerprint sensed by the fingerprint sensor 21 is the pre-stored fingerprint and deliver the result of dactyloscopy to outside.

Note that in this embodiment of the fingerprint identification system 20, fingerprint information sensed by the fingerprint sensor 21 is stored once in the first memory 23, but the first memory 23 may be omitted in case it is not required for the convenience of signal processing.

Figure 7:
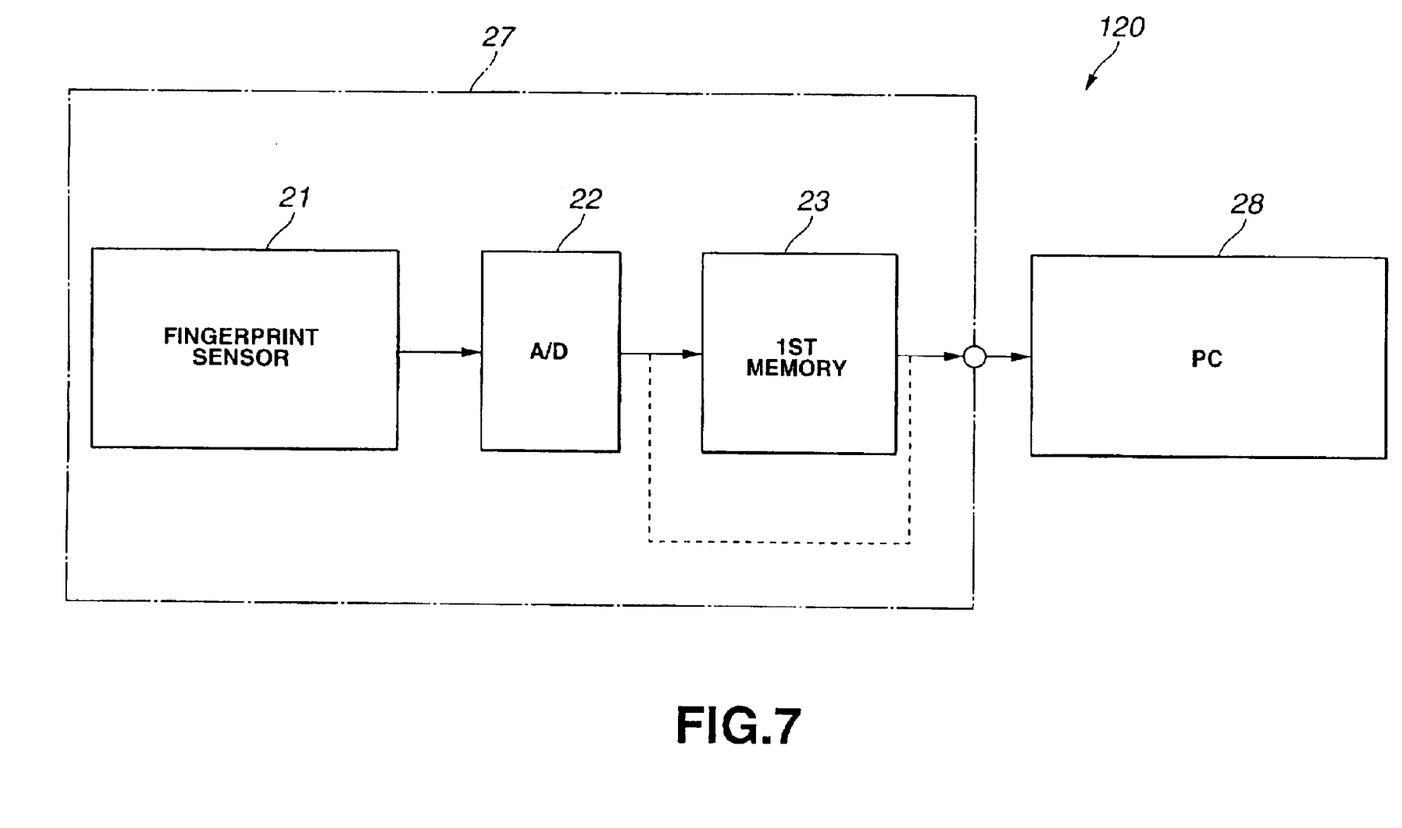
FIG. 7 is a block diagram of another example of the fingerprint identification system according to the present invention.

As shown in FIG. 7, the fingerprint identification system may be implemented as a one generally indicated with a reference 120, including the fingerprint sensor 21, the A-D converter 22 and the first memory 23, both enclosed in one unit 27, and adapted such that an output from the unit 27 is supplied to a personal computer (PC) 28 having the functions of the second memory 24, the registration unit 25 and the comparison unit 26. It should be noted that the first memory 23 may be omitted as indicated with a broken line in FIG. 7.

INDUSTRIAL APPLICABILITY

As having been described in the foregoing, according to the present invention, at least one dummy cell with a dummy electrode having a parasitic capacitance nearly equal to that of a sense electrode of the sensor cell is disposed in a position in an area having no relation with an object under detection (an area where the finger is not applied when the capacitance sensor is used as a fingerprint sensing means), and differentiation is made between outputs of the sensor cell and the dummy cell. Thus, it is possible to eliminate the influence of the variation in parasitic capacitance caused to develop at the sense electrode of the sensor cell by a production tolerance, and so the accuracy and controllability of the no-signal state (air level) can be improved.

What is claimed is:

1. A capacitance sensor comprising:
a sensor array in which sensor cells each having a sense electrode are disposed in the form of an array;
a dummy block having, disposed in a position corresponding to a row in an area outside the sensor array and having no relation with any object under detection, at least one dummy cell having a dummy electrode nearly identical in parasitic capacitance to the sense electrode of the sensor cell; and
a differentiation circuit to differentiate between a sensor cell output from the sensor array and a dummy cell output from the dummy block,
wherein the dummy block is formed from one column of dummy cells corresponding to each row in the sensor array.

2. The apparatus as set forth in claim 1, wherein the dummy block is provided on either side of the sensor array.

3. The apparatus as set forth in claim 1, wherein the charge of the sensor cell is acquired to sense a capacitance developed between the sense electrode and the finger surface for acquisition of fingerprint information.

4. A fingerprint identification system comprising:

a fingerprint sensing means including:

a sensor array in which sensor cells each having a sense electrode are disposed in the form of an array;

a dummy block having, disposed in a position corresponding to a row in an area outside the sensor array and having no relation with any object under detection, at least one dummy cell having a dummy electrode nearly identical in parasitic capacitance to the sense electrode of the sensor cell; and a differentiation circuit to differentiate between a sensor cell output from the sensor array and a dummy cell output from the dummy block;

a storage means for storing pre-registered fingerprint pattern information; and a comparison means for comparing fingerprint information acquired by the fingerprint sensing means with registered pattern information stored in the storage means and delivering the result of comparison as a result of dactyloscopy, wherein the dummy block is formed from one column of dummy cells corresponding to each row in the sensor array.

* * * * *

UNITED STATES PATENT AND TRADEMARK OFFICE
CERTIFICATE OF CORRECTION

PATENT NO.         : 6,937,031 B2                                         Page 1 of 1
APPLICATION NO. : 10/363547
DATED              : August 30, 2005
INVENTOR(S)        : Masaki Yoshioka It is certified that error appears in the above-identified patent and that said Letters Patent is hereby corrected as shown below:

Title Page: and Col. 1.
Item (54) should be read as follows:
-- CAPACITANCE SENSOR, AND FINGERPRINT IDENTIFICATION SYSTEM USING SAME --.

Signed and Sealed this

Twelfth Day of December, 2006

JON W. DUDAS
*Director of the United States Patent and Trademark Office*